(12) United States Patent
Poulin

(10) Patent No.: US 7,516,050 B2
(45) Date of Patent: Apr. 7, 2009

(54) DEFINING THE SEMANTICS OF DATA THROUGH OBSERVATION

(76) Inventor: Christian D. Poulin, P.O. Box 969, Portsmouth, NH (US) 03802

( * ) Notice: Subject to any disclaimer, the term of this patent is extended or adjusted under 35 U.S.C. 154(b) by 639 days.

(21) Appl. No.: 11/077,373

(22) Filed: Mar. 9, 2005

(65) Prior Publication Data

US 2006/0206293 A1 Sep. 14, 2006

(51) Int. Cl.
*G06F 7/60* (2006.01)
(52) U.S. Cl. ......................................................... 703/2
(58) Field of Classification Search ...................... 703/2
See application file for complete search history.

(56) References Cited

U.S. PATENT DOCUMENTS

| | | | | |
|---|---|---|---|---|
| 4,831,550 | A | * | 5/1989 | Katz .......................... 704/240 |
| 5,357,250 | A | * | 10/1994 | Healey et al. ................ 341/107 |
| 6,304,833 | B1 | * | 10/2001 | Ferkinhoff et al. .............. 703/2 |
| 6,532,449 | B1 | | 3/2003 | Goertzel et al. |
| 7,136,710 | B1 | * | 11/2006 | Hoffberg et al. .............. 700/83 |
| 7,308,648 | B1 | * | 12/2007 | Buchthal et al. .............. 704/10 |
| 2004/0167893 | A1 | * | 8/2004 | Matsunaga et al. ............. 707/6 |

* cited by examiner

*Primary Examiner*—Paul L Rodriguez
*Assistant Examiner*—Eunhee Kim
(74) *Attorney, Agent, or Firm*—Fish & Richardson P.C.

(57) ABSTRACT

Techniques for estimating the structure and meaning of data using probability are described. The techniques include retrieving data as data strings from a data source, producing a dataset from the retrieved data strings and building a statistical model of parent-child relationships from data strings in the dataset. Building the statistical model includes determining incidence values for the data strings in the dataset and concatenating the incident values with the data strings to provide child variables. The techniques include analyzing the child variables and the parent variables to produce statistical relationships between the child variables and a parent variable, determining probabilities values based on the determined parent child relationships and building an ontological representation of the data based on subsequent conditional probabilities values.

24 Claims, 5 Drawing Sheets

```
C:\Program.exe -inference model.net cpi case_1.hcs
inference model: model.net target:cpi case:case_1.hcs
P(cpi = 109.05-110.95) = 0
P(cpi = 110.95-112.85) = 0
P(cpi = 112.85-114.75) = 0
P(cpi = 114.75-116.55) = 1
```

FIG. 4

DEFINING THE SEMANTICS OF DATA THROUGH OBSERVATION

BACKGROUND

This invention relates to data analysis software.

Data is available in many forms, for many topics, and from many sources. The Internet is one example of a data source. The Internet has become an important tool to conduct commerce and gather information. Users, through a web browser, visit internet sites, e.g., web sites by accessing web sites and download web pages, e.g., documents in HTML (hypertext markup language) or equivalent.

SUMMARY

According to an aspect of the present invention, a method executed in a computer system for estimating a probability that an event will occur includes retrieving data as data strings from a data source, producing a dataset from the retrieved data strings and building a statistical model of parent-child relationships from data strings in the dataset. Building the statistical model includes determining incidence values for the data strings in the dataset and concatenating the incident values with the data strings to provide child variables. The method further includes analyzing the child variables and the parent variables to produce statistical relationships between the child variables and a parent variable, determining probabilities values based on the determined parent child relationships and building an ontological representation of the data based on subsequent conditional probabilities values.

The following embodiments are within the scope of the invention. The method determines probabilities values use conditional probabilities. The method determines probabilities values use basic probabilities. The parent variable represents an outcome and the child variables represent prior knowledge relevant to the probability of the outcome. The prior knowledge data is not in the parent variable. Analyzing the child variables and the parent variables produce statistical relationships using a Bayesian probability algorithm. Multiple routines determine conditional probability by measuring condition probability of each child variable based on the relevance of each child variable to the parent variable. The method aggregates the conditional probabilities and compares the aggregated conditional probabilities to parent. A value of information analysis is performed to determine which child variable is more valuable than other child variables. The ontological representation is used to determine the structure of child variables as those child variables relate to the parent variable. A value for the parent variable is predicted based on the ontological representation. The text strings represent any alphanumeric text data. Noise is filtered from the data retrieved from the data source to provide the data strings. Context-specific noise is filtered from data in the data set.

According to an additional aspect of the present invention, a computer program product resides on a computer readable medium. The computer program product is for estimating a probability that an event will occur. The computer program product includes instructions for causing a computer to retrieve data as data strings from a data source and to produce a dataset from the retrieved data strings. The computer program product builds a statistical model of parent-child relationships from data strings in the dataset by executing instructions to determine incidence values for the data strings in the dataset; and concatenate the incident values with the data strings to provide child variables. The computer program product also includes instructions to analyze the child variables and the parent variables to produce statistical relationships between the child variables and a parent variable, determine probabilities values based on the determined parent child relationships and build an ontological representation of the data based on subsequent conditional probabilities values.

According to an additional aspect of the present invention, an apparatus includes a processor and a computer readable medium storing a computer program product for estimating a probability that an event will occur. The computer program product includes instructions for causing the processor to retrieve data as data strings from a data source and to produce a dataset from the retrieved data strings. The computer program product builds a statistical model of parent-child relationships from data strings in the dataset by executing instructions to determine incidence values for the data strings in the dataset; and concatenate the incident values with the data strings to provide child variables. The computer program product also includes instructions to filter the child variables and the parent variables to produce statistical relationships between the child variables and a parent variable, determine probabilities values based on the determined parent child relationships and build an ontological representation of the data based on subsequent conditional probabilities values.

The invention provides a technique for analyzing data for discovery of underlying relationships defined by unknown rules. The process builds an ontology to find these rules, e.g., how data objects in the collection of data in a database relate to each other.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4 is a diagram depicting a prediction table in a Web page format that provides an exemplary results presentation to the user.

DETAILED DESCRIPTION

Figure 1:
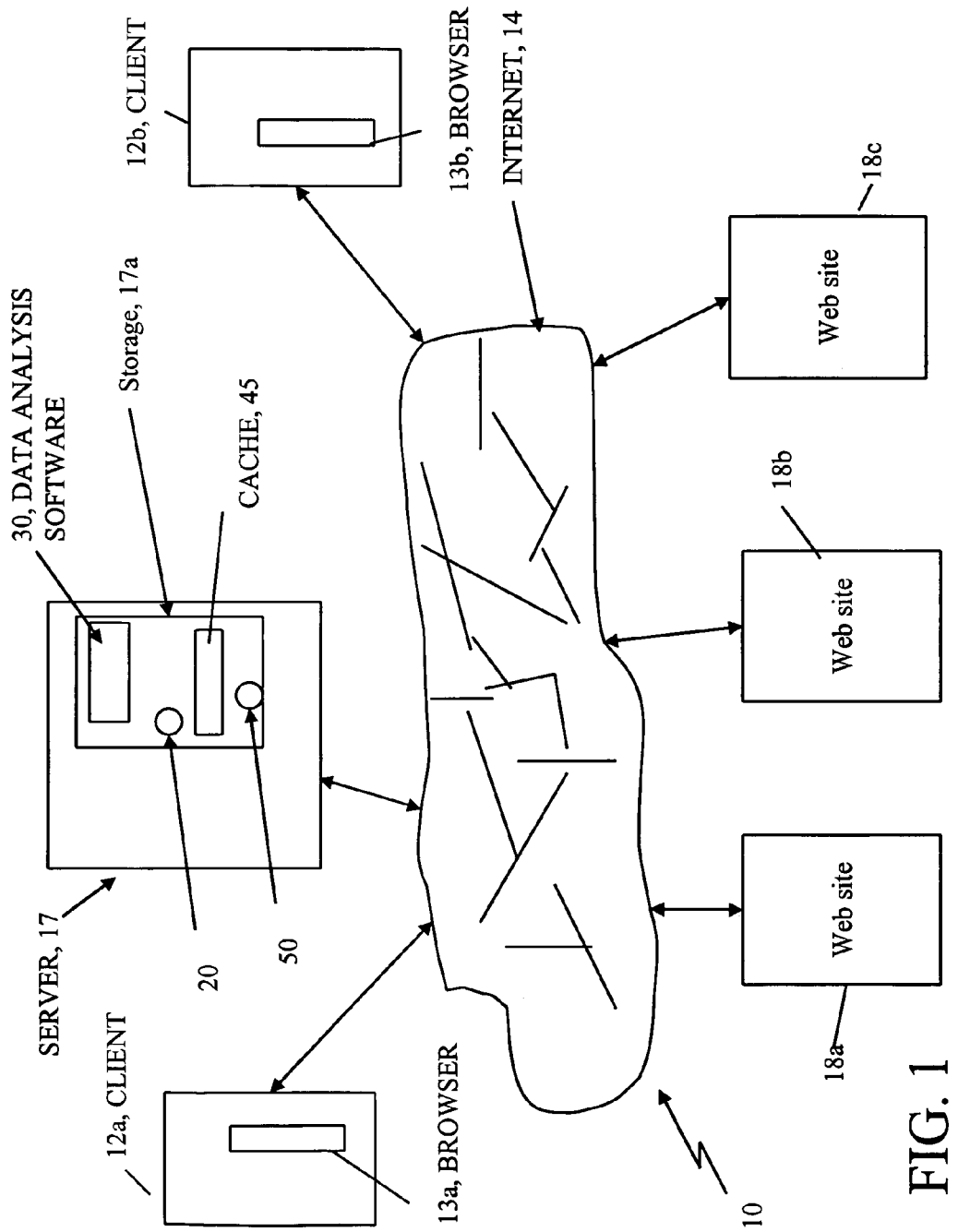
FIG. 1 is a block diagram of system employing data analysis software.

Referring to FIG. 1, a networked computer system 10 includes clients 12a-12b connected to a server system 17 through a first network, e.g., the Internet 14. The clients 12a-12b run browser programs 13a-13b that can request the server computer 17 to invoke data analysis software 30. The data analysis software 30 resides on a computer readable medium 17a, e.g., disk or in memory for execution. The data analysis software 30 can analyze data from any data source. As one example, the data analysis software 30 analysis data obtained from, e.g., the Internet by accessing site(s), e.g., web sites 18a-18d that are on web servers (not shown) through a universal resource locator (URL). A URL allows access to information that may be on sites 18a-18d, e.g., web sites (HTTP), FTP sites, NEWS groups, etc.

The data analysis software 30 can analyze data accessible through various protocols including HTTP, FTP mentioned above and other protocols such as proprietary protocols, e.g., for a database by modifying the URL location to contain a key word or other indicia for the proprietary protocol. Other networks and data sources could be used. For instance, the data analysis software 30 can operate on data from a proprietary data feed, a private network and so forth.

Although the data analysis software 30 is shown in FIG. 1 residing on a server 17 that can be operated by an intermediary service, it could be implemented as a server process on a client system 12 or as a server process on a corporate or organization-based server. On the server 17 the data analysis software 30 includes analysis objects 20 that are persistent objects, i.e., stored on a computer hard drive 17a of the server in a database (not shown). At invocation of the data analysis software 30, the analysis objects 20 are instantiated, i.e., initialized with parameters and placed into main memory (not shown) of the server 17, where they are executed through the data analysis software 30.

As described below, the output from the data analysis software 30 is a result object 50 in the form of a prediction table that can be output as an HTML or equivalent web page. The result object 50 will include information as to a database or text representation of relationships between parent and child data. Formats for the data can be ".net" files (industry standard file format for a Bayesian network file). Alternatively, other formats can be used such as a standard text file and so forth.

Figure 2A:
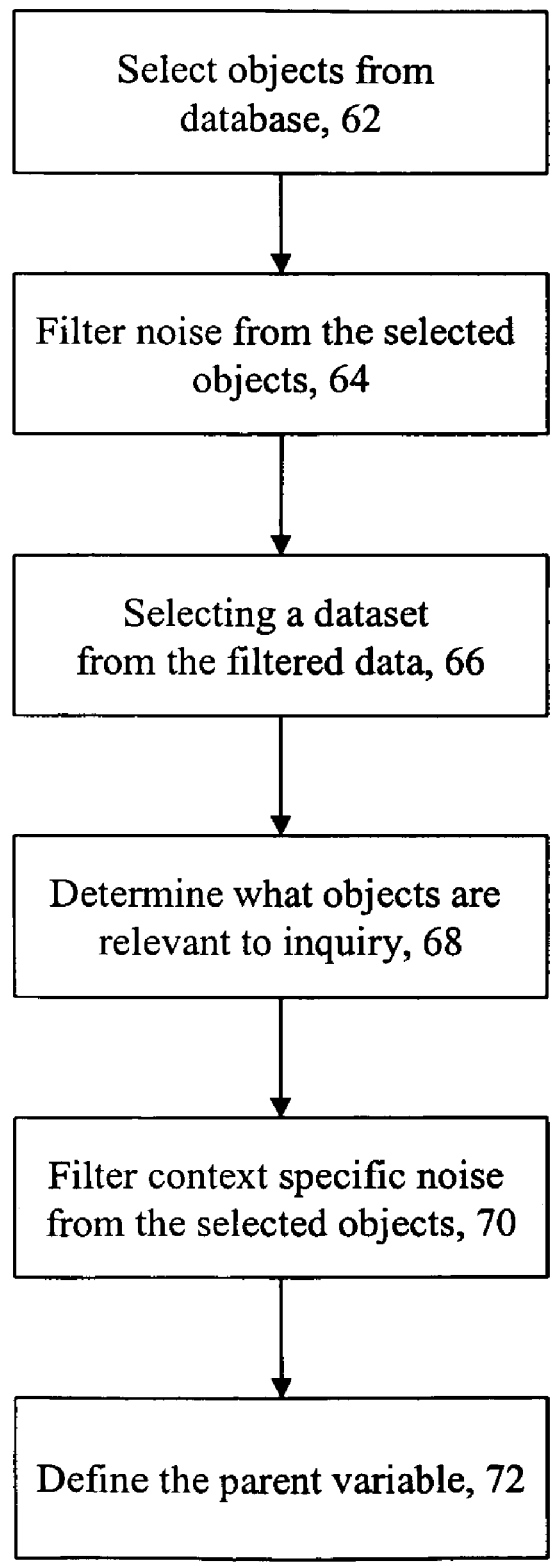
FIGS. 2A-2B are a flow chart showing the data analysis software.
Figure 2B:
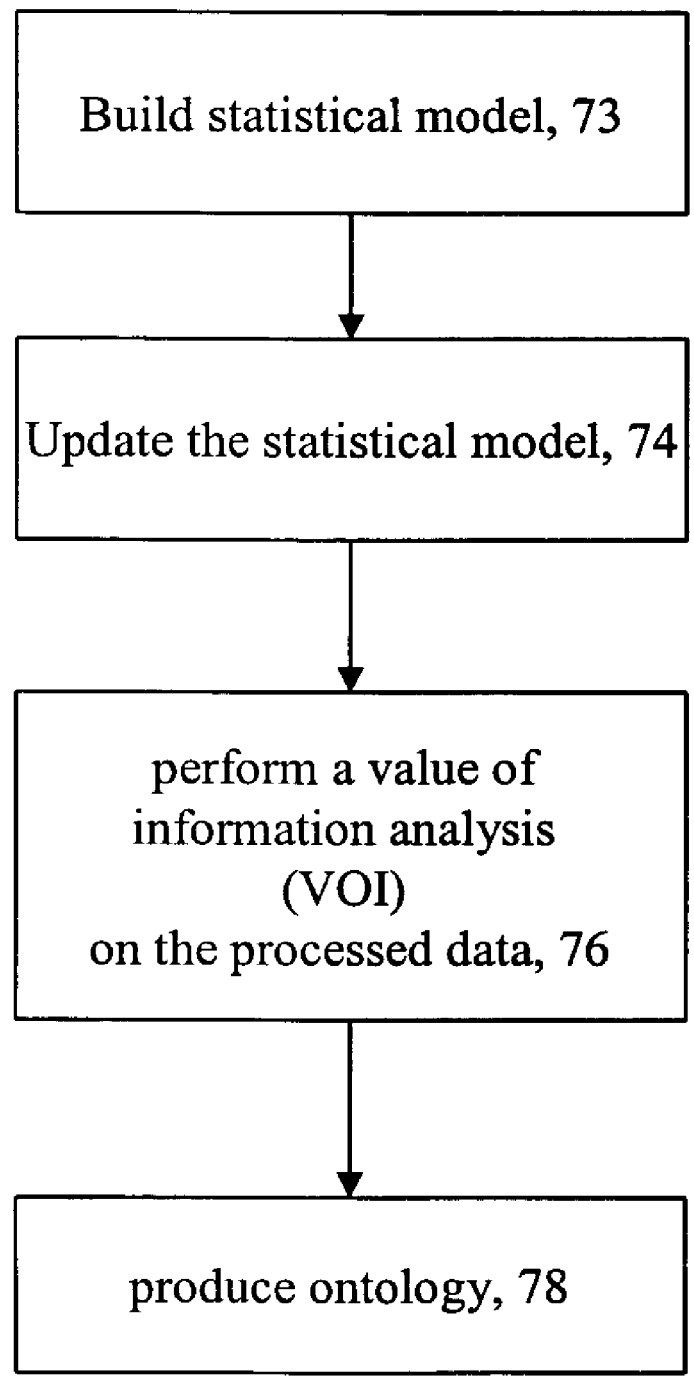

Referring to FIG. 2, the process of building an ontology based on data is shown. In the process 30, preprocessing of the data is performed. A database containing text strings is selected 62. The text strings represent any alphanumeric text data such as weather data, financial data, political data, generic data and so forth. The database of the text strings need not be in any particular structure. The process takes the text data from the database and filters 64 noise from the data. For example, if the data is initially retrieved in HTML format, the filtering process removes what would be considered noise in the process 30 such as HTML tags and scripts. There exist other types of noise at this stage for example, extra spaces, extra or inaccurate punctuation and irregular characters. In addition, noise can be somewhat problem specific, as is discussed below.

The data are selected 66 to provide a dataset that will be used to structure the data into child variables for analysis. The process 30 builds a parent and child relationship model from the dataset. The parent/child relationship model is defined as the parent variable being the desired outcome, e.g., how often would the process 30 expects to obtain a result, e.g., of parent possibilities. The child relationships are the prior knowledge that the process 30 examines to determine the parent possibilities. Given a known structure of text data, the state of probability is the prior knowledge, i.e., how many text data have been used out of that structure. The process 30 determines 68 what text data are relevant to the inquiry and the text data that needs to be examined by the process 30. The process 30 chooses the actual variables to examine by choosing the child variables, e.g., the prior data for inclusion in a dataset.

In the example below, conditional probabilities are used to build the ontology. That is, relationships are determined for multiple child variables to the parent variable. Thus while determining probabilities values uses conditional probabilities, basic probabilities (e.g., child to parent child to parent serial type of analysis) could also be used. Multiple routines determine conditional probability by measuring condition probability of each child variable based on the relevance of each child variable to the parent variable. The determined conditional probabilities are aggregated and compare aggregated conditional probabilities to parent.

A filter is employed 70 to remove context specific noise, e.g., data that are not relevant to the inquiry from the dataset. For example, time relevant data that is replaced by more time current data could be filtered out of the dataset, so that the data are not inadvertently included twice in the dataset.

The process defines 72 the parent variable. The parent variable can be an index, or particular variable inside the database. The parent variable is the variable that the process 30 is specifically trying to determine. A child variable can be chosen and promote to a parent variable.

The process builds 73 the statistical model from the dataset and parent variable. A statistical engine, algorithm or filter (hereinafter engine) defines the parent relationships between the child variables in the child variable dataset and the parent variable. The process determines incidence values for each of the child variables in the dataset. The incident values are concatenated to the data strings to provide the child variables. The child variables are stored in a child variable dataset.

One example of a statistical engine is a Naïve Bayesian Statistical engine to define correlative relationships. Others could be used. A Bayesian Statistical engine defines correlative relationships between child and parent variables. Other more complex relationships can be defined such as child to child relationships. The Bayesian engine processes the dataset to produce child and parent variables that are defined by applying the Bayes theorem to the dataset to establish relationships between the child and parent variables.

Figure 3:
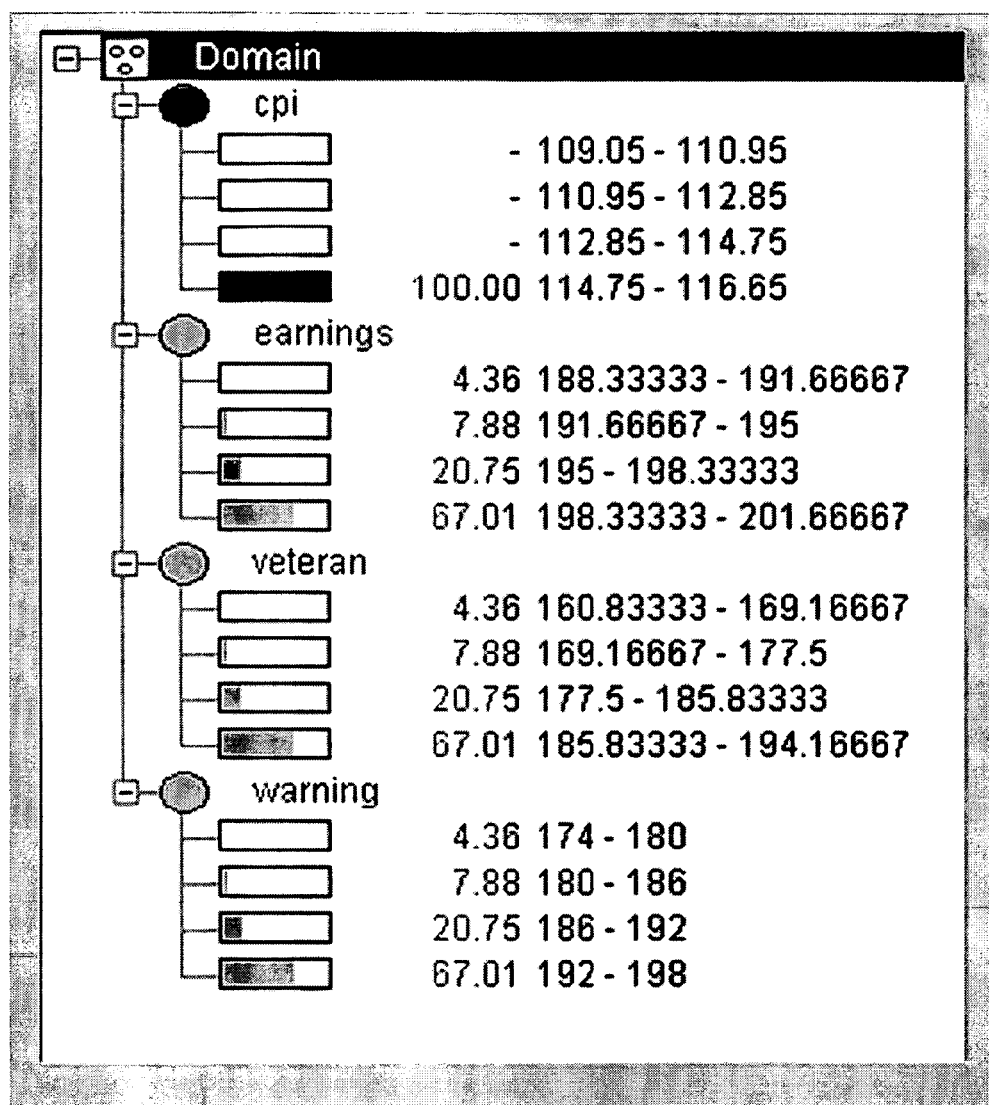
FIG. 3 is a diagrammatical view depicting node tables.

The Bayesian Statistical engine outputs node tables that represent the child and parent variables and their relationships, that is, the relationships are defined as the statistical relevance of one variable to other variables in the dataset. The parent and child nodes thus would include a value which represents the data <alpha numeric string> and statistical analysis relationships among other child and parent variable relationships. Examples of such tables are depicted in FIG. 3.

The process updates the statistical data in the node tables each time new data are included in the dataset because a static model might be predictive but, by updating the data used in the model on a dynamic basis, the updating may make the model more useful. The process need not define new relationships but merely places updated data in the proper defined relationships.

A value of information analysis (VOI) processing estimates 76 how relevant a particular child is to the overall model. In addition, the VOI analysis can estimate how a change in one variable affects other variables. If a gap is detected in the data, the process estimates values for data using an extrapolation or other data estimation techniques.

The process defines 78 an ontology from the data using statistical techniques of correlation and inference and value of information analysis. The ontology is essentially a statistically collected group of node tables that represent a statistical correlation and relevance of the child variables to the parent variable. An example of the resulting data from which an ontology is derived is FIG. 3" In this example, the Ontology is (but is not limited to) "CPI+5, Earnings, Veteran, Warning."

As an example, a search is conducted on the Internet and the search desires to produce a model for predicting "the consumer price index for the previous day." The parent variable would be the prediction of the consumer price index. The process selects a database, e.g., a web site such as "money.cnn.com." for a particular day at a particular time. The data from the site is downloaded. Any HTML and script tags are filtered out of the downloaded data as noise. The process counts the number of occurrences for words in the data downloaded from the web site. The data are sorted according to the number of occurrences of the words in the data downloaded. The process counts the occurrences of the words in the data feed to give the variables a value. The process filters out punctuation, common words, such as prepositions, articles, and so forth and filters out context-specific words. The process adds the parent variable, which in this example is the consumer price index for the previous day.

The process updates the database by concatenating new data to the dataset and rebuilding the statistical relationships in the model.

The statistics shown in TABLE 1 are numeric distributions of frequency of occurrences for words in the data, derived from a database containing many entries. The version of TABLE 1 shown below represents a truncated version of a typical table here selected to illustrate data that are most relevant to the example, in order to simplify explanation of the example. To have, e.g., the word "earnings" show up, e.g., 200 times, the document may have to be, e.g., 20 or 30 pages or more long. Thus, in practice data mining of the site occurs on a periodic, e.g., a daily basis, over an extended period of time, e.g., weeks, months and so forth. The more data that is analyzed, the more accurate the prediction may be.

Referring to FIG. 3, a depiction of node tables is shown. The node tables depict the statistical relevance of discrete ranges for the parent variable (in this example CPI) being in a particular discrete range of each of the child variables, where the ranges of the parent and child variables correspond to a discretized, i.e., producing discrete divisions, of the ranges for the particular variable. That is, given the parent variable "CPI," various ranges of the occurrence of the word "earnings" and corresponding ranges of the occurrences of parent variable "Consumer Price Index" (herein "CPI") represented in the rows of the node table "Earnings" will have different correlations to different ranges of CPI represented by columns of discrete intervals in the node table "Earnings." Thus, in the example shown in FIG. 3, for instance, the Node table shows there's a 67% chance that earnings will be between 198 and 201 if the CPI is between 114 and 116. The ontology identifies which words are relevant based on how many times the words show up in the database. That is, the ontological representation is used to determine the structure of child variables as those child variables relate to the parent variable. A prediction for a value for the parent variable would be based on the ontological representation.

Referring to FIG 4, a prediction table that is rendered on a monitor or other output device is shown. The prediction table results from passing the node tables in FIG 3 through the Bayesian engine. The prediction table displays prediction ranges for the variable "CPI." Thus, given values in "case 1 HCS" (an arbitrary file name for the child variables and their values discussed above), the process predicts that the CPI's value is in a definitive range of 114.75 to 116.55 (P CPI=114.750-116.55)=1.

Each dataset contains data relationships that are defined by rules that are yet to be discovered. The process that builds the ontology is used to find these rules, e.g., how the data objects in the collection of data in the database relate to each other. As in the example above, with regard to a CPI price index, one variable might be more relevant that another variable.

A syntax for an Ontology entry can be for example:
cpi+5:
Earnings (60%), Warning (32.6%), Veteran (31%)
Where "cpi" is the parent and the most relevant child variables with the degree of relevance to the parent increasing by 5 points on the value of "cpi" are listed.

Described below in TABLE 1 is an exemplary, truncated example, showing actions in the process and exemplary intermediate results for those actions.

TABLE 1

The following example is the comparison of financial news and the November 2004 Consumer Price Index (CPI)
1. Pull http://money.cnn.com (22 Nov 2004 : 5pm)
2. Filter out HTML and script tags such as "<HTML>".
Noise words like "Sponsored" and "CNN"
FORTUNE 500 Hershey buys Mauna Loa for $112M Xerox reaffirms earnings outlook
MIDSIZED COMPANIES A hole in Krispy Kreme's earnings Trump's casinos file for bankruptcy NEWSMAKERS Air Bill AOL's Case to head Exclusive Resorts
ECONOMY Early November retail sales up 3.7% Snow: U.S. deficits to fall
MARKETS &STOCKS SEC prepares 'best-price' reg overhaul
Dollar hovers near record low
WORLD BIZ Bayer may have delayed warning Weak dollar dents Eurostocks
TECHNOLOGY CA to pick IBM veteran as its new CEO
Apple soars on analyst's upgrade
MUTUAL FUNDS Pilgrim Baxter guys settle for $160M
Janus boosts staff, goes for growth
3. Sort/Count Words as discrete variables
for,to,earnings,warning,veteran,upgradeMUTUAL,up,staff,,soars,settle,sales,retail,reg,record,reaffirms,prepares,pick,overhaulDollar,outlook,on,new,near,may,low,its,in,hovers,hole,head,have,guys,growth,goes,file,fallMARKETS,dollar,dents,delayed,deficits,casinos,buys,boosts,bankruptcy,as,analyst's,Xerox,Weak,WORLD,U.S.,Trump's,Snow:,STOCKS,SEC,Resorts,Pilgrim,November,NEWSMAKERS,Mauna,MIDSIZED,Loa,Krispy,Kreme's,IBM,Hershey,FUNDS,FORTUNE,Exclusive,EurostocksTECHNOLOGY,Early,ECONOMY,Case,COMPANIES,CEOApple,CA,Bill,Bayer,Baxter,BIZ,Air,AOL's,A,500,3.7%,'best-price',&,$160MJanus,$112M
4,3,2,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1
4. Filter out punctuation, common words, for example "for" and "to", and in this case, out of context numbers.
5. Add parent variable (in this case an index indicator, such as the CPI)
cpi,earnings,warning,veteran,upgradeMUTUAL,up,staff,soars,settle,sales,retail,reg,record,reaffirms,prepares,pick,overhaul,Dollar,outlook,on,new,near,may,low,its,in,hovers,hole,head,have,guys,growth,goes,file,fallMARKETS,dollar,dents,delayed,deficits,casinos,buys,boosts,bankruptcy,as,analysts,Xerox,Weak,WORLD,U.S,Trumps,Snow,STOCKS,SEC,Resorts,Pilgrim,November,NEWSMAKERS,Mauna,MIDSIZED,Loa,Krispy,Kremes,IBM,Hershey,FUNDS,FORTUNE,Exclusive,EurostocksTECHNOLOGY,Early,ECONOMY,Case,COMPANIES,CEOApple,CA,Bill,Bayer,Baxter,BIZ,Air,AOLs
115.7,2,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1,1

TABLE 1-continued

6. Expand Model data set to include significant statistical variance
cpi,earnings,warning,veteran,upgradeMUTUAL,up,staff,soars,settle,sales,retail,reg,record,reaf
firms,prepares,pick,overhaul,Dollar,outlook,on,new,near,may,low,its,in,hovers,hole,head,have,guys,gr
owth,goes,file,fallMARKETS,dollar,dents,delayed,deficits,casinos,buys,boosts,bankruptcy,as,analysts,
Xerox,Weak,WORLD,U.S,Trumps,Snow,STOCKS,SEC,Resorts,Pilgrim,November,NEWSMAKERS,
Mauna,MIDSIZED,Loa,Krispy,Kremes,IBM,Hershey,FUNDS,FORTUNE,Exclusive,EurostocksTEC
HNOLOGY,Early,ECONOMY,Case,COMPANIES,CEOApple,CA,Bill,Bayer,Baxter,BIZ,Air,AOLs
115.7,200,195,190,180,170,160,150,140,130,120,110,100,90,80,70,60,50,40,30,20,19,18,17,1
6,15,14,13,12,11,10,9,8,7,6,5,4,3,2,1,1,1,1,1,1,1,1,1,1,1,1,1,1,1,1,1,1,1,1,1,1,1,1,1,1,1,1,1,1,1,1,1,1,1,1,1,1,1,
1,1,1,1,1,1,1,1,1,1,1,1
7. Build Bayesian
8. Update Model with news or CPI changes so as to build complete model with variability in
frequency of objects. (Excerpt to reduce space)
cpi,earnings,warning,veteran
115.7,200,195,190
111.0,196,188,170
110.0,190,177,165
9. Define Ontology A number of embodiments of the invention have been described. Nevertheless, it will be understood that various modifications may be made without departing from the spirit and scope of the invention. Accordingly, other embodiments are within the scope of the following claims.

What is claimed is:

1. A method executed in a computer system for estimating a probability associated with a parent variable that an event corresponding to the parent variable will occur, the method comprises:
    retrieving data as data strings from a data source;
    producing a dataset from the retrieved data strings;
    building a statistical model of parent-child relationships from data strings in the dataset by:
    determining incidence values for the data strings in the dataset; and
    concatenating the incident values with the data strings to provide child variables;
    analyzing the child variables and the parent variable to produce statistical relationships between the child variables and the parent variable;
    determining probabilities values for the event based on the determined parent child relationships; and
    building an ontological representation of the data based on subsequent conditional probabilities values.

2. The method of claim 1 wherein determining probabilities values uses conditional probabilities.

3. The method of claim 1 wherein determining probabilities values uses basic probabilities.

4. The method of claim 1 wherein the parent variable represents an outcome and the child variables represent prior knowledge relevant to the probability of the outcome.

5. The method of claim 4 wherein prior knowledge data that is not in the parent variable.

6. The method of claim 1 wherein analyzing the child variables and the parent variables to produce statistical relationships uses a Bayesian probability algorithm engine.

7. The method of claim 1 wherein multiple routines determine conditional probability by measuring condition probability of each child variable based on the relevance of each child variable to the parent variable.

8. The method of claim 7 further comprising
    aggregating the conditional probabilities; and
    comparing the aggregated conditional probabilities to parent.

9. The method of claim 1 further comprising
    performing a value of information analysis to determine which child variable is more relevant to estimating a probability associated with a parent variable than other child variables.

10. The method of claim 1 wherein building the ontological representation is used to determine a structure of child variables as those child variables relate to the parent variable.

11. The method of claim 1 further comprising:
    predicting a value for the parent variable based on the ontological representation.

12. The method of claim 1 wherein the text strings represent any alphanumeric text data.

13. The method of claim 1 further comprising:
    filtering noise from the data retrieved from the data source to provide the data strings.

14. The method of claim 1 further comprising:
    filtering context-specific noise from data in the data set.

15. A computer program product residing on a computer readable medium for estimating a probability associated with a parent variable that an event corresponding to the parent variable will occur, the computer program product comprising instructions for causing a computer to:
    retrieve data as data strings from a data source;
    produce a dataset from the retrieved data strings;
    build a statistical model of parent-child relationships from data strings in the dataset by:
    determine incidence values for the data strings in the dataset; and
    concatenate the incident values with the data strings to provide child variables;
    analyze the child variables and the parent variable to produce statistical relationships between the child variables and the parent variable;
    determine probabilities values for the event based on the determined parent child relationships; and
    build an ontological representation of the data based on subsequent conditional probabilities values.

16. The computer program product of claim 15 wherein the parent variable represents an outcome and the child variables represent prior knowledge relevant to the probability of the outcome.

17. The computer program product claim 15 wherein instructions to filter the child variables and the parent variables to produce statistical relationships uses a Bayesian probability algorithm.

18. The computer program product of claim 15 wherein multiple routines determine conditional probability by instructions to measure condition probability of each child variable based on the relevance of each child variable to the parent variable.

19. The computer program product of claim 15 further comprising instructions to:
aggregate the conditional probabilities; and
compare the aggregated conditional probabilities to parent.

20. The computer program product of claim 15 further comprising instructions to:
perform a value of information analysis to determine which child variable is more relevant to estimating a probability associated with a parent variable than other child variables.

21. The computer program product of claim 15 further comprising instructions to predict a value for the parent variable based on the ontological representation.

22. The computer program product of claim 15 further comprising instructions to filter noise from the data retrieved from the data source to provide the data strings.

23. An apparatus comprising:
a processor; and
a computer readable medium storing a computer program product for estimating a probability associated with a parent variable that an event corresponding to the parent variable will occur, the computer program product comprising instructions for causing the processor to:
retrieve data as data strings from a data source;
produce a dataset from the retrieved data strings;
build a statistical model of parent-child relationships from data strings in the dataset by:
determine incidence values for the data strings in the dataset; and
concatenate the incident values with the data strings to provide child variables;
analyze the child variables and the parent variables to produce statistical relationships between the child variables and the parent variable;
determine probabilities values for the event based on the determined parent child relationships; and
build an ontological representation of the data based on subsequent conditional probabilities values.

24. The apparatus of claim 23 wherein the computer program product further comprises instructions to predict a value for the parent variable based on the ontological representation.

* * * * *